(12) United States Patent
Gyuris et al.

(10) Patent No.: US 10,284,704 B2
(45) Date of Patent: May 7, 2019

(54) SYSTEM AND METHOD FOR CONNECTING MOBILE DEVICES WITH MACHINE VISION SYSTEMS

(71) Applicant: COGNEX CORPORATION, Natick, MA (US)

(72) Inventors: Krisztian Gyuris, Tárnok (HU); Mario Joussen, Nideggen (DE); John Bryan Boatner, Andover, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/707,384

(22) Filed: Sep. 18, 2017

(65) Prior Publication Data

US 2018/0007187 A1 Jan. 4, 2018

Related U.S. Application Data

(63) Continuation of application No. 15/045,351, filed on Feb. 17, 2016, now Pat. No. 9,769,302.

(51) Int. Cl.
*H04B 7/00* (2006.01)
*H04M 1/725* (2006.01)
*H04W 76/11* (2018.01)
*H04W 48/16* (2009.01)

(52) U.S. Cl.
CPC ..... *H04M 1/7253* (2013.01); *H04M 1/72533* (2013.01); *H04W 48/16* (2013.01); *H04W 76/11* (2018.02)

(58) Field of Classification Search
CPC ... H04W 84/18; H04W 88/06; H04W 76/021; H04W 8/005; H04W 48/16; H04W 4/80; H04W 76/11; H04W 4/00; H04W 88/02; H04M 1/7253; H04M 2250/02; H04M 1/72533; H04M 2250/04; H04M 2250/14; H04M 1/0202; H04M 1/72519; H04M 2250/52

See application file for complete search history.

(56) References Cited

U.S. PATENT DOCUMENTS

| | | |
|---|---|---|
| 7,212,637 B2 | 5/2007 | Salisbury |
| 8,112,066 B2 | 2/2012 | Ben Ayed |
| 8,116,679 B2 | 2/2012 | Dunko |
| 8,432,261 B2 | 4/2013 | Talty et al. |
| 8,498,572 B1 | 7/2013 | Schooley et al. |
| 8,880,240 B2 | 11/2014 | Grimm et al. |
| 9,106,307 B2 | 8/2015 | Molettiere et al. |

(Continued)

*Primary Examiner* — Nhan T Le

(57) ABSTRACT

A connecting system is provided for machine vision operations using a mobile device. The connecting system can include a machine vision system with an imaging device, as well as an identification feature associated with the machine vision system. The identification feature can include at least one of: a symbol for communicating identification information for the machine vision system to the mobile device via an imaging of the symbol by a camera associated with the mobile device, and an electronic identification device for communicating the identification information to the mobile device via electronic transmission to the mobile device. The identification information, when received at the mobile device, can facilitate connecting of the mobile device with the machine vision system for interoperation of the mobile device and the machine vision system.

19 Claims, 6 Drawing Sheets

(56) References Cited

U.S. PATENT DOCUMENTS

| | | |
|---|---|---|
| 9,135,429 B2 | 9/2015 | Moosavi et al. |
| 9,769,302 B2 * | 9/2017 | Gyuris ................ H04M 1/7253 |
| 2006/0082437 A1 * | 4/2006 | Yuhara .................... B60R 25/04 |
| | | 340/5.82 |
| 2013/0183899 A1 | 7/2013 | Gorsev |
| 2013/0311570 A1 | 11/2013 | Kuo |
| 2014/0099526 A1 | 4/2014 | Powell et al. |
| 2014/0158769 A1 | 6/2014 | Powell et al. |
| 2014/0160304 A1 | 6/2014 | Galor et al. |
| 2014/0369232 A1 | 12/2014 | Kim et al. |
| 2015/0035650 A1 | 2/2015 | Lind |
| 2015/0048166 A1 | 2/2015 | Lei et al. |
| 2015/0048167 A1 | 2/2015 | Russell et al. |
| 2015/0053765 A1 | 2/2015 | Powell et al. |
| 2015/0055182 A1 * | 2/2015 | Parks .................... G06F 3/1204 |
| | | 358/1.15 |
| 2015/0199549 A1 | 7/2015 | Lei et al. |
| 2015/0220766 A1 | 8/2015 | Russell et al. |
| 2015/0317503 A1 | 11/2015 | Powell et al. |
| 2017/0061466 A1 * | 3/2017 | Srivastava ......... G06Q 30/0238 |

* cited by examiner

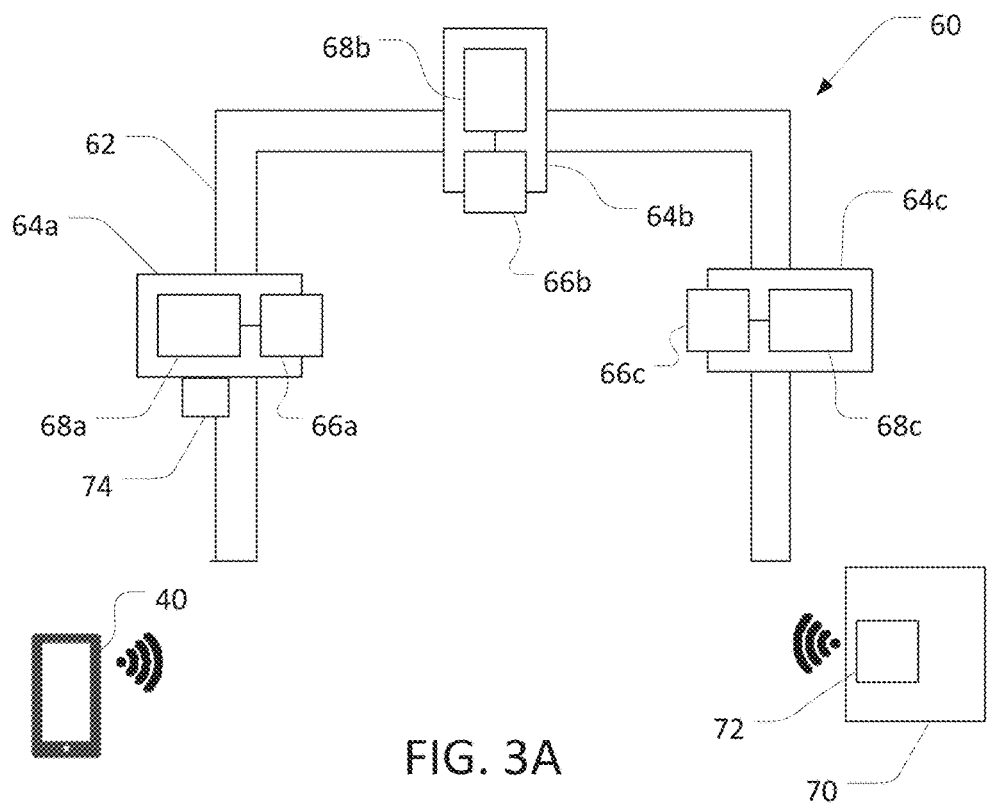
FIG. 3A
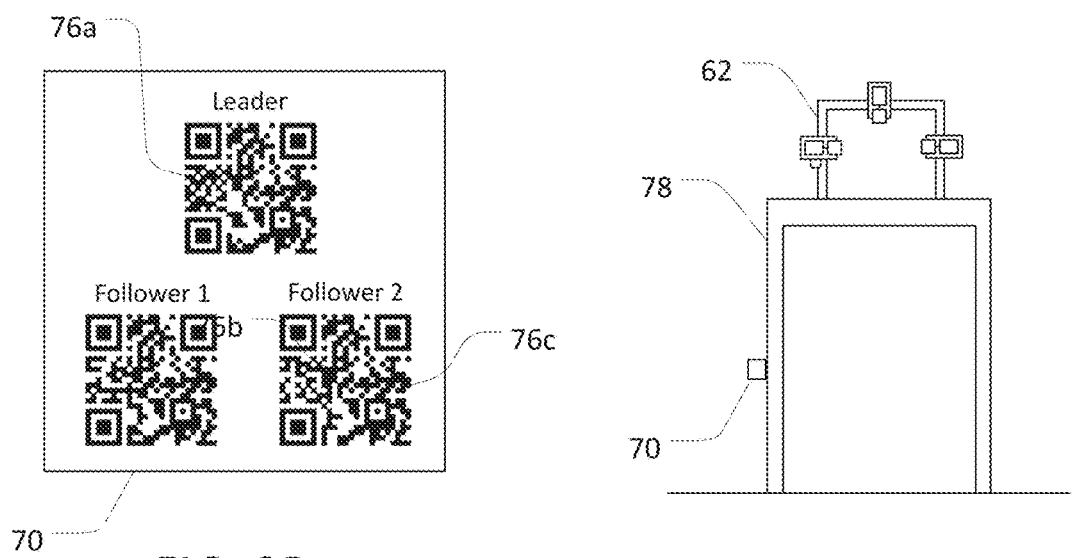
FIG. 3B
FIG. 3C

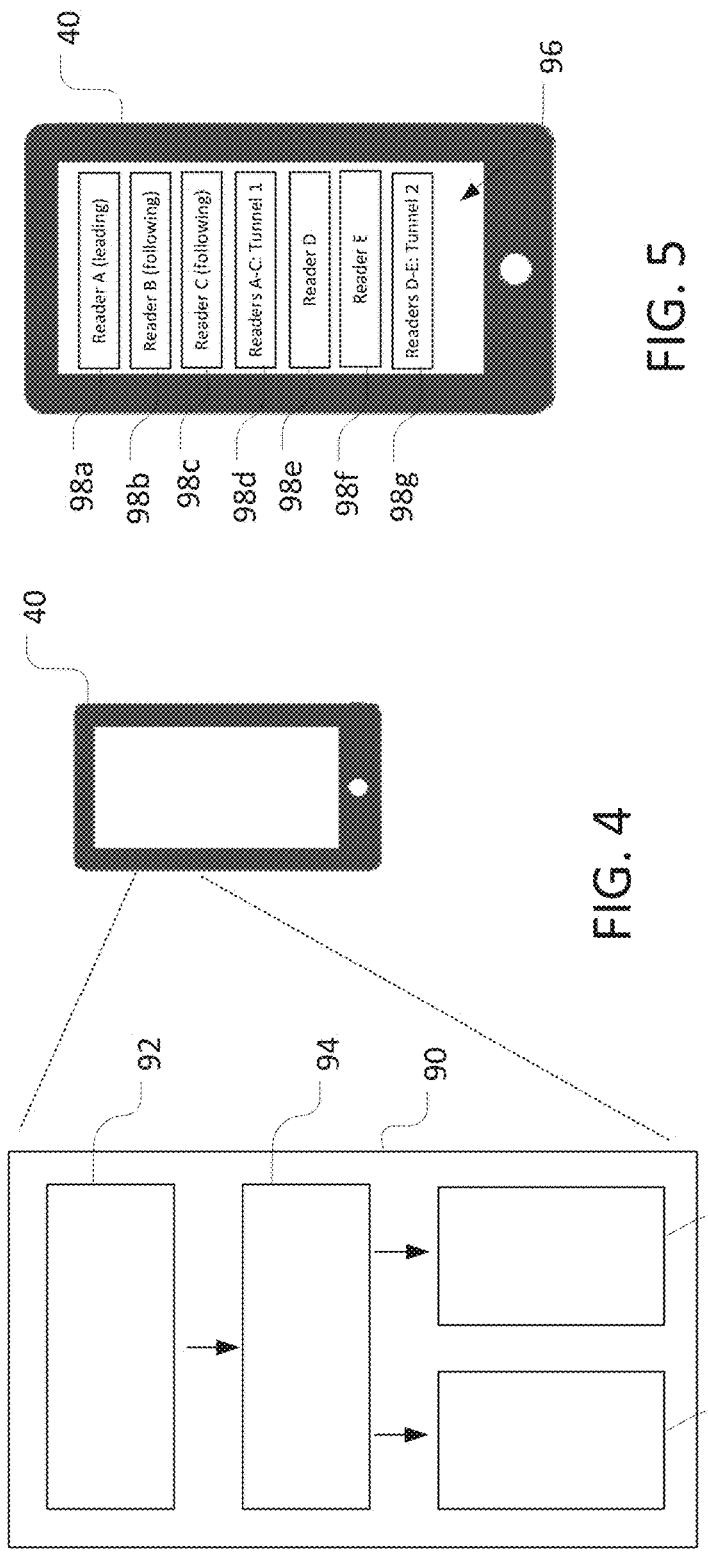

SYSTEM AND METHOD FOR CONNECTING MOBILE DEVICES WITH MACHINE VISION SYSTEMS

CROSS-REFERENCE TO RELATED APPLICATIONS

This application is a continuation of U.S. patent application Ser. No. 15/045,351, titled "System and Method for Connecting Mobile Devices with Machine Vision Systems," filed on Feb. 17, 2016, to issue as U.S. Pat. No. 9,769,302 on Sep. 19, 2017, the entire contents of which are hereby incorporated by reference.

STATEMENT REGARDING FEDERALLY SPONSORED RESEARCH OR DEVELOPMENT

Not applicable.

BACKGROUND OF THE TECHNOLOGY

The present technology relates to machine vision systems, and more specifically, to the connecting of mobile devices and machine vision systems.

Machine vision systems are generally configured for use in capturing images of objects or symbols and analyzing the images to identify the objects or decode the symbols. Accordingly, machine vision systems generally include one or more devices for image acquisition and/or image processing. In conventional applications, these devices can be used to acquire images, and/or to analyze those images, including for the purpose of decoding imaged symbols such as barcodes or text.

While some operations of machine vision systems can proceed automatically, it may also be possible for operators to access machine vision systems for various reasons. In some cases, it may be useful for an operator to access a machine vision system in order to adjust configurations (e.g., configurations for image acquisition or analysis), perform maintenance, monitor aspects of system performance, and so on.

BRIEF SUMMARY OF THE TECHNOLOGY

In some cases, it may be useful for an operator to access a machine vision system using a mobile device, such as a smartphone or tablet. For example, conventional manufacturing facilities often include many distinct machine vision systems, which may be disposed at various locations throughout the facilities. If enabled to selectively connect a mobile device with a chosen one or more of the machine vision systems within the facility, an operator in such a facility (e.g., a line or floor manager) may be able to monitor, maintain, or otherwise manage these different machine vision systems relatively efficiently.

However, while the portability of a mobile device may be useful for accessing machine vision systems in distributed (or other) arrangements, it may sometimes be cumbersome to connect the mobile device with a particular machine vision system, in order to initiate the desired management of that system. For example, the smaller screen size of many mobile devices may create significant difficulty or inconvenience when an operator is required to choose a particular machine vision system to access out of a relatively large list of systems.

The present embodiments overcomes these and other disadvantages of the prior art by providing improved connecting between mobile devices and machine vision systems.

Accordingly, some embodiments include a connecting system for machine vision operations using a mobile device. The connecting system can include a machine vision system with an imaging device, as well as an identification feature associated with the machine vision system. The identification feature can include at least one of: a symbol for communicating identification information for the machine vision system to the mobile device via an imaging of the symbol by a camera associated with the mobile device, and an electronic identification device for communicating the identification information to the mobile device via electronic transmission to the mobile device. The identification information, when received at the mobile device, can facilitate connecting of the mobile device with the machine vision system for interoperation of the mobile device and the machine vision system.

Other embodiments include a machine vision application for a mobile device and a machine vision system, where the machine visions system includes an imaging device and an identification feature. The machine vision application can include an identification module and a connecting module. The identification module can be configured to receive identification information for the machine vision system based upon one or more of: an imaging, by a camera associated with the mobile device, of a symbol forming at least part of the identification feature, and an electronic transmission to the mobile device via an electronic identification device forming at least part of the identification feature. The connecting module can be configured to connect the mobile device with the machine vision system, based upon receiving the identification information, for execution of a machine vision operation.

Still other embodiments include a method of connecting a machine vision system with a mobile device, where the machine vision system includes an imaging device and an identification feature. The method can include receiving identification information for the machine vision system based upon one or more of: an imaging, by a camera associated with the mobile device, of a symbol forming at least part of the identification feature, and an electronic transmission to the mobile device via an electronic identification device forming at least part of the identification feature. Based upon receiving the identification information, the mobile device can be connected with the machine vision system for execution of a machine vision operation including one or more of: management of the imaging device and processing of an image acquired via the imaging device.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE SEVERAL VIEWS OF THE DRAWINGS

FIG. 3A is a schematic view of a connecting system with an identification feature to facilitate connecting of the mobile device of FIG. 1 and another machine vision system that includes a reader tunnel, in accordance with other embodiments of the disclosure;

FIG. 3B is a schematic view of symbols included in the identification feature of FIG. 3A;

FIG. 3C is a schematic view of the identification feature of FIG. 3A installed remotely from the machine vision system of FIG. 3A;

FIG. 4 is a schematic view of a mobile application for use with the mobile device of FIGS. 1 and 3A;

FIG. 5 is a schematic view of a user interface generated by the mobile application of FIG. 4;

Figure 1:
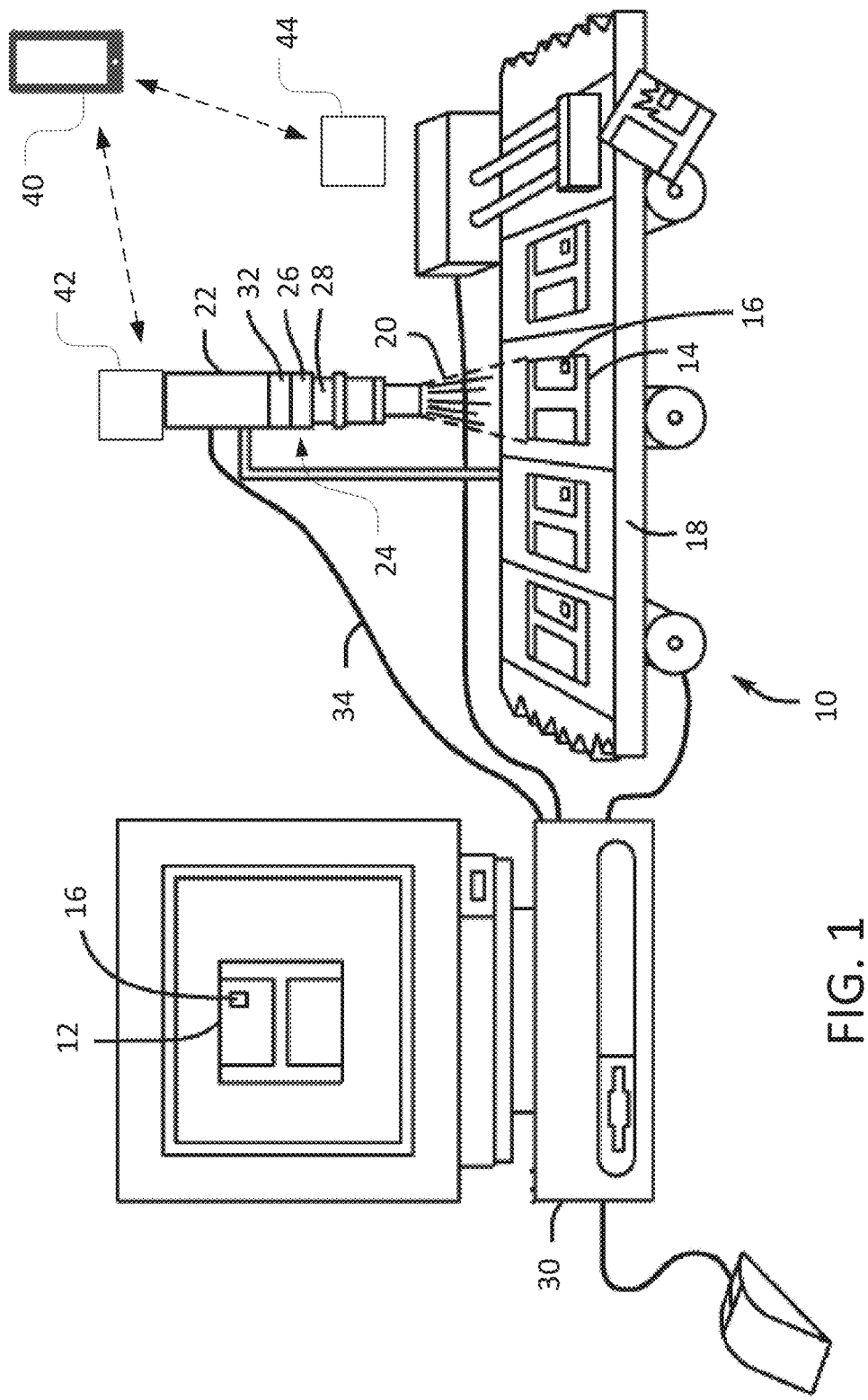
FIG. 1 is a schematic view of a connecting system with an identification feature to facilitate connecting of a machine vision system and a mobile device, in accordance with some embodiments of the disclosure.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto, including illustration in the drawings of a particular order of operations for a particular method, are not intended to limit the claimed subject matter to the particular form disclosed. Rather, the intention is to cover all modifications, equivalents, and alternatives falling within the spirit and scope of the claimed subject matter.

The disclosed subject matter may be implemented as a system, method, apparatus, or article of manufacture using standard programming and/or engineering techniques and/or programming to produce hardware, firmware, software, or any combination thereof to control an electronic based device to implement operations or functionality detailed herein. In this regard, as used herein, unless otherwise limited or defined, the terms "component," "system," "device," "module," and the like are intended to refer to either hardware, software, software in execution, or a combination of hardware and software.

As used herein, unless otherwise limited or defined, the term "processor" can include any type of processor, CPU, microcontroller, digital signal processor, or other device capable of executing software instructions. The term "processor" may include devices with one or more processors and memories and/or one or more programmable hardware elements.

Also as used herein, unless otherwise limited or defined, the term "memory" cam include a non-volatile medium (e.g., a magnetic media or hard disk, optical storage, or flash memory, and so on), a volatile medium, such as system memory (e.g., random access memory (RAM) such as DRAM, SRAM, EDO RAM, RAMBUS RAM, or DR DRAM, and so on), or an installation medium, such as software media (e.g., a CD-ROM, or floppy disks, on which programs may be stored and/or data communications may be buffered, and so on). The term "memory" may also include other types of memory or combinations thereof.

Unless otherwise limited or defined, the use of "including," "comprising," or "having" and variations thereof herein is meant to encompass the items listed thereafter and equivalents thereof as well as additional items. Similarly, the phrases "at least one of A, B, and C," "one or more of A, B, and C," and the like, are meant to indicate A, or B, or C, or any combination of A, B, and/or C.

Various embodiments of the disclosure are described herein in connection with connecting a mobile device with a machine vision system including an electronic imaging device and associated processors and communication interfaces. That is because the features and advantages of the embodiments of the disclosure are well suited for this purpose. Still, it should be appreciated that the various aspects of the disclosure can be applied in the context of other types of systems and connections, including the connection of mobile devices with machine vision systems other than those specifically discussed herein (e.g., handheld imaging systems).

Generally, embodiments of the disclosure can include systems and methods for easily connecting (i.e., establishing a connection for communication between) a mobile device and a machine vision system device through the use of an identification feature, such as a machine readable symbol or an electronic device configured for transmission of identification information. As used herein, unless otherwise limited or modified, "connecting" of two devices can include associating the two devices for cooperative or other interoperation, including associating two devices for electronic communication or for joint execution of a machine vision operation (e.g., an image acquisition or analysis). Further, as used herein, "connecting" of a mobile device with a machine vision system can generally include connecting the mobile device with the machine vision system as a whole, or connecting the mobile device with one or more components of the machine vision system, such as one or more image acquisition (or processing) devices. Two devices can be "connected" via wireless communication or otherwise, and can be connected directly or via an intermediary communication architecture (e.g., a factory intranet, the internet, or other networks or communication devices).

Generally, when a particular mobile device is disposed within appropriate proximity to the identification feature, identification information for the machine vision system can be communicated to the mobile device using the identification feature. In some embodiments, an identification feature associated with a particular machine vision system (or component thereof) can include a representation of a symbol (e.g., a 1-D or 2-D barcode) that encodes identification information for the machine vision system (or component). Accordingly, in order for the identification information to be communicated to a mobile device, a camera of the mobile device can be used to capture an image of the symbol, and the mobile device (or an application accessible thereby) can decode the imaged symbol.

In some embodiments, an identification feature associated with a particular machine vision system (or component thereof) can include an electronic identification device that is capable of electronic data transmission. Such a device can include, for example, a Bluetooth® beacon, a near-field communication ("NFC") tag, a radio-frequency identification ("RFID") tag, and so on). (Bluetooth® is a registered trademark of Bluetooth SIG, Inc. in the United States, foreign jurisdictions, or both.) In these embodiments, the identification information can be communicated to the mobile device via electronic transmission of the identification information by the electronic identification device.

Based upon receiving the identification information, the mobile device can then be connected with the machine vision system (e.g., connected with the system as a whole, or with one or more components thereof). In this regard, relevant identification information can generally include information that facilitates establishing or maintaining data communication between the mobile device and the machine vision system. For example, identification information communicated via an identification feature for a machine vision system (or component(s) thereof) can include information such as identifiers for the machine vision system or component(s) thereof (e.g., serial numbers or IP addresses). The mobile device can then utilize the identifiers to establish and maintain communicate with the relevant machine vision system or component(s), whether through direct connections (e.g., through transmission of data to an IP address of the machine vision system) or indirect connections (e.g., through transmission of data to a central system along with a header or other designator that directs the data to the machine vision system).

In some embodiments, identification information for a machine vision system can include other information facilitating connecting of a mobile device with the machine vision system. For example, some identification features for machine vision systems can be configured to transmit information specifying appropriate syntax, headers, or other communication protocols (e.g., communication formatting requirements, size or content limits, and so on), such that a connected mobile device can appropriately format, address and transmit communications to, and can appropriately receive and interpret communications from, the machine vision systems.

In some embodiments, identification information for a machine vision system that is communicated to a mobile device may not include information that directly facilitates communication between the mobile device and the machine vision system. For example, identification information encoded at an identification feature can provide a look-up value or location, which can be used to query a data repository to receive information such as serial numbers, IP addresses, and so on.

Once connected with a machine vision system, a mobile device can be used to execute various operations relative to the machine vision system. For example, the mobile device can be used to directly control image acquisition or analysis, adjust tool (or other) parameters for image acquisition or analysis, monitor aspects of system performance, perform maintenance operations, or otherwise manage the machine vision system.

Generally, embodiments of the disclosure can be used with a variety of different mobile devices, including smartphones, tablets, laptops, and so on. Similarly, embodiments of the disclosure can generally be used with a variety of different machine vision systems, including machine vision systems in manufacturing assembly, test, measurement, automation, and control applications, among others, as non-limiting examples.

FIG. 1 illustrates an example machine vision system 10 according to one embodiment of the disclosure. Generally, the machine vision system 10 is configured to acquire one or more images 12 of an object 14 containing a machine readable symbol 16. As depicted, for example, the conveyor 18 transports the objects 14 and causes relative movement between the objects 14 and the field of view 20 of an imaging device configured as an image acquisition device 22, such that the machine vision system 10 can capture successive images of the objects 14 (or other subjects).

The image acquisition device 22 can include a processor 26, which can be configured to control aspects of image acquisition, as well as, in some embodiments, image processing and decoding. For example, the processor 26 can be coupled to an imaging sensor 28, either forming part of the imaging sensor 28 or being electronically linked to the imaging sensor 28. The image acquisition device 22 can also include a memory medium 32 coupled to the imaging sensor 28 and/or the processor 26. The memory medium 32 can be used for storing scanned or processed images 12, buffering data and communications, and the like.

In some embodiments, the processor 26 can be encoded with an imaging module 24 (e.g., image acquisition software) operable to perform any of various types of image acquisitions. The imaging module 24 can be configured to, among other things, to control the acquisition of multiple images within a single reading operation, control illumination, acquire image data, and process/decode the acquired image data into usable information. In some embodiments, image-processing aspects of the imaging module 24 can be configured to process image information from the sensor 28 in order to identify particular features in one or more images (e.g., edges or shapes on an object), identify movements represented in one or more images (e.g., passage of a part on a conveyor), or identify and decode various symbols (e.g., one- or two-dimensional bar codes, or textual labels or markings). It will be understood that the imaging module 24, in some embodiments, can alternatively (or additionally) be encoded or executed at a different processor, such as a processor of a separate computer 30.

As noted above, the machine vision system 10 includes an imaging device configured as the image acquisition device 22, which can include various modules for acquiring and processing relevant images. In other embodiments, and as also discussed below, an imaging device can alternatively (or additionally) be configured in other ways. In some embodiments, an imaging device can be configured as an accessory for an image acquisition device such as a camera or other sensor and lens assembly, with the accessory being configured to assist the image acquisition device (or a user thereof) in acquiring images. For example, the imaging device can be configured as a lighting accessory that assists in properly illuminating a target for image acquisition, or a targeting accessory that assists in properly aligning a camera or other image acquisition device.

In some embodiments, an imaging device can be configured as an image processing device, which can be operated to process images that are acquired by an associated image acquisition device. For example, an imaging device can be configured as a computing device or arrangement of modules for decoding symbols in images that are received from an associated image acquisition device.

As also noted above, it may be useful to conduct various operations for the machine vision system 10 using a mobile device. In some cases, for example, the computer 30 can be used to execute monitoring, maintenance, calibration, configuration, or other management operations for the image acquisition device 22. In other cases, however, it may be useful to use a mobile device, such as smartphone 40 for this purpose (and others). To that end, the machine vision system 10 can further include a communication interface 42, and an identification feature 44 for communicating identification information.

Generally, the communication interface 42 can be configured to facilitate communication between the smartphone 40 (or other mobile devices) and the machine vision system 10. For example, the communication interface 42 can include an antennae and associated modules for wireless communication, a wired connection for electronic communication (e.g., for connection of a USB, Ethernet or other cable), an optical (e.g., infrared) or sonic interface, and so on. In some embodiments, the communication interface 42 can indirectly facilitate communication between the smartphone 40 and the machine vision system 10. For example, the communication interface 42 can be configured to receive an Ethernet cable for connection to a local network, and the smartphone 40 can exchange information with the communication interface 42 via that local network.

In some embodiments, the communication interface 42 can be a could be a multi-channel interface, for communication with multiple components of the machine vision system 10. For example, the communication interface 42 can include a first channel for communication with the computer 30 and a second channel for communication with the image acquisition device 22. In some embodiments, the communication interface 42 can be a tiered interface, which can be used to communicate with one component of the machine vision system 10 via another component of the machine vision system 10. For example, the communication interface 42 can be configured to facilitate communication with the image acquisition device 22 via the computer 30 (or vice versa).

Generally, the identification feature 44 can be configured to communicate identification information to the smartphone 40 (or to other mobile devices within a particular range). In some embodiments, the identification feature 44 can be a passive identification feature, such as a representation of a symbol that communicates identification information via the imaging of the symbol with an imaging device (e.g., camera) associated with the smartphone 40.

Figure 2A:
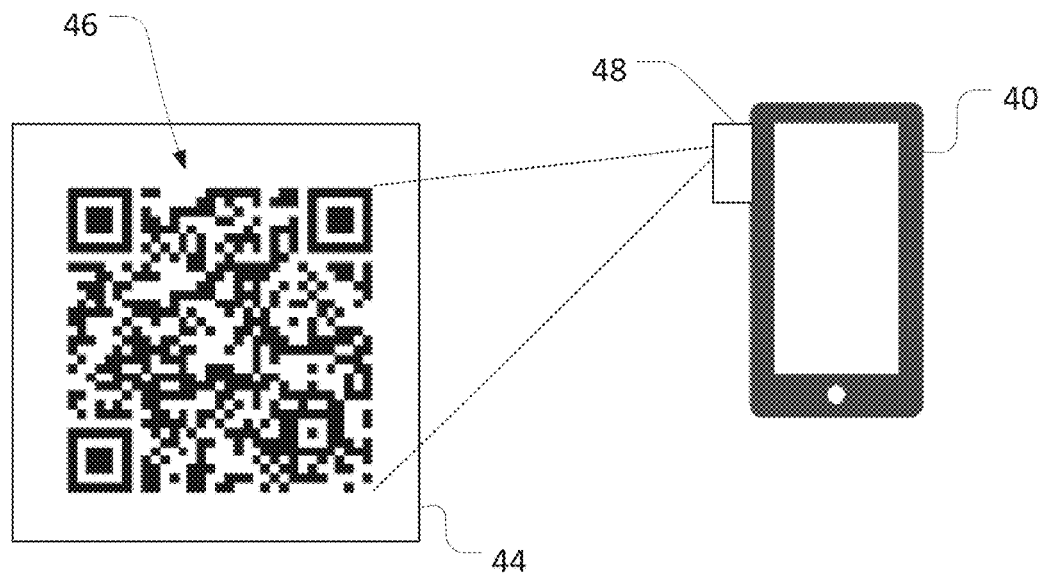
FIG. 2A is a schematic view of an imaging, by the mobile device of FIG. 1, of a symbol included in the identification feature of FIG. 1.

In some embodiments, as illustrated in FIG. 2A, the identification feature 44 can be configured as a machine-readable symbol such as a 2-dimensional barcode 46. Identification information for the machine vision system 10 can be encoded in the barcode 46, such that decoding of an image of the barcode 46 can allow the identification information to be extracted. Accordingly, for example, the identification feature 44 can communicate identification information to the smartphone 40 via the imaging of the barcode 46 using a camera 48 associated with (e.g., integrally included in) the smartphone 40 and decoding of the image (e.g., using a decoding application installed on the smartphone 40).

Figure 2B:
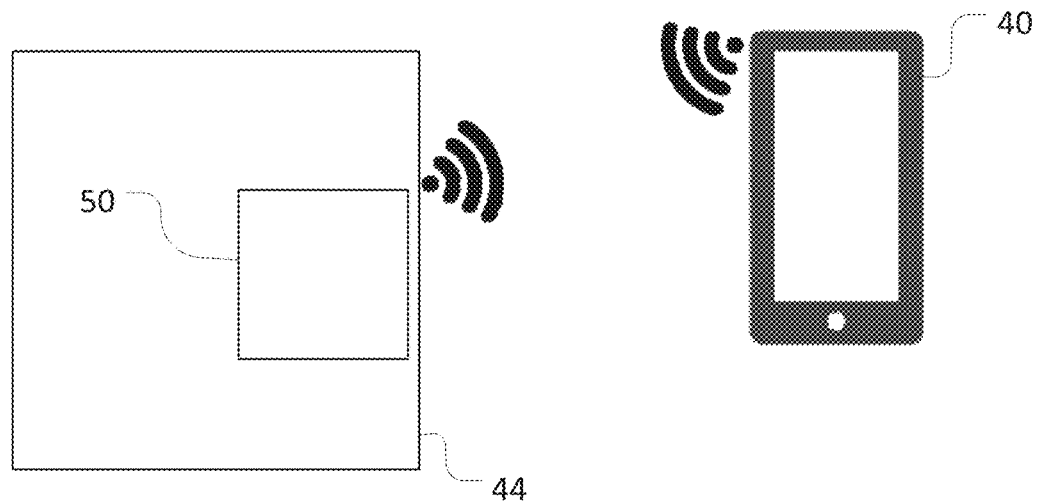
FIG. 2B is a schematic view of communication between the mobile device of FIG. 1 and an electronic identification device included in the identification feature of FIG. 1.

In some embodiments, the identification feature 44 can be configured to communicate the identification information through electronic data transmission (e.g., rather than by displaying encoded identification information for optical imaging). For example, as illustrated in FIG. 2B, the identification feature 44 can include an electronic identification device 50 configured as an NFC tag, Bluetooth beacon, RFID tag, or similar other device. Accordingly, the electronic identification device 50 can store identification information for the machine vision system 10 (e.g., in an associated memory or circuit) and, when the smartphone 40 (or other mobile device) is within appropriate proximity, can electronically transmit the identification information to the smartphone 40. In some embodiments, the electronic identification device 50 can be self-powered, or powered by the machine vision system 10, such that the electronic identification device 50 can actively transmit identification information even when the smartphone 40 is not within appropriate proximity. In some embodiments, the electronic identification device 50 can be configured to harvest power from other devices (e.g., from a radio signal received from the smartphone 40) in order to transmit a return signal with the identification information.

The identification information that is communicated by the identification feature 44 (e.g., via acquisition of an image of a symbol included in the identification feature 44, or electronic transmission of data by an electronic device included in the identification feature 44) can take a variety of forms and can be associated with the machine vision system 10 generally or with one or more particular components of the machine vision system 10 (e.g., the image acquisition device 22). In some embodiments, the identification information can indicate (e.g., include) an address or an identifier, such as an IP address associated with the communication interface 42 or a particular component of the machine vision system 10 (e.g., the image acquisition device 22) or a serial number of the machine vision system 10 or a component thereof. In some embodiments, the identification information can indicate (e.g., include) proximity information, such as a distance from the receiving mobile device to the identification feature 44 or an associated part of the machine vision system 10.

In some embodiments, the identification information that is communicated by the identification feature 44 can directly facilitate connecting of the smartphone 40 (or other mobile device) with the machine vision system 10. For example, where the identification information includes an IP address for connecting to the machine vision system 10 (or a component thereof), the smartphone 40 can sometimes simply connect with the machine vision system 10 by addressing relevant communications to the IP address.

In some embodiments, the identification information that is communicated by the identification feature 44 can indirectly facilitate connecting of the smartphone 40 (or other mobile device) with the machine vision system 10. For example, where the identification information includes a serial number or other non-address identifier for the machine vision system 10, the smartphone 40 may transmit that serial number or other identifier to a different system (not shown) in order to determine the appropriate address for communication with the machine vision system 10. As another example, the identification information can indicate information that assists the smartphone 40 in formatting communications with the machine vision system 10. For example, the identification information can include information regarding communication (or other) protocols used by the machine vision system 10 (or components thereof), such that the smartphone can properly format communications with the machine vision system (e.g., use proper headers, syntax, and so on).

In some embodiments, the identification feature 44 can be located in relative close proximity to the machine vision system 10. For example, the identification feature can be physically mounted (not shown) to the image acquisition device 22, the computer 30, or another component of the machine vision system 10. In some embodiments, the identification feature 44 can be disposed remotely from one or more components of the machine vision system 10. For example, the machine vision system 10 may sometimes be disposed in a location that is not conducive to communication of identification information (e.g., via imaging of a symbol with a hand-held mobile device such as the smartphone 40). In such a case, it may be useful to dispose the identification feature 44 remotely from the machine vision system 10, such that it can be more easily accessed.

In some embodiments, a machine vision system can include multiple imaging devices. As illustrated in FIG. 3A, for example, a machine vision system 60 can include a tunnel 62 including a plurality of readers 64 (identified individually, herein, as readers 64a, 64b, and 64c). Each of the readers 64 can include a corresponding image acquisition device 66 (identified individually, herein, as image acquisition devices 66a, 66b, and 66c) such as an assembly of one or more optical sensors and lenses. In some embodiments, each of the readers 64 (or a subset thereof) can further include an image analysis module 68 (identified individually, herein, as image analysis modules 68a, 68b, and 68c), such as image analysis software.

As illustrated, one of the readers 64 (e.g., the reader 64a) is configured as a master or "leading" reader, and others of the readers 64 (e.g., the readers 64b and 64c) are configured as slave or "following" reader. As such, for example, the readers 64b and 64c can be controlled by (or via) the reader 64a, and selection of settings for the reader 64a can result in the use of corresponding settings by the readers 64b and 64c. In other embodiments, the various readers 64 can operate independently to various degrees.

Embodiments of the disclosure can facilitate connecting of a mobile device, such as the smartphone 40, with one or more of the readers 64 of the tunnel 62. For example, an identification feature 70 can be associated with the machine vision system 60 and, as with the identification feature 44 and the machine vision system 10 (see FIG. 1), can be configured to communicate identification information to the smartphone 40 in order to facilitate connecting of the smartphone 40 with the machine vision system 60. Similarly to the identification feature 44, the identification feature 70 can be configured in various ways (e.g., as an barcode or other imageable symbol, or as an electronic device capable of electronically transmitting identification information). For example, the identification feature 70 can include a Bluetooth® beacon 72, which transmits a serial number or IP address for the machine vision system 60 to the smartphone 40 once the smartphone 40 is within appropriate proximity to the identification feature 70.

Generally, the identification feature 70 can be configured to communicate information for connecting with the machine vision system 60 generally, for connecting with a single one of the readers 64 (e.g., the leading reader 64a), or for connecting with multiple (e.g., all) of the readers 64 collectively. For example, based upon receipt of identification including a serial number or IP address, the smartphone 40 can connect with the machine vision system 60 generally, can connect with the leading reader 64a (through which the other readers 64b and 64c can also be managed), or can connect with the readers 64 collectively. Such connections can be realized, for example, via communication through a relevant communication interface, such as a wireless antenna 74 connected to the leading reader 64a.

In some embodiments, the identification feature 70 can be configured to communicate distinct information for connecting with distinct components of the machine vision system 60. As illustrated in FIG. 3B, for example, an alternative configuration of the identification feature 70 can include multiple barcodes, such as two-dimensional barcodes 76a, 76b, and 76c, which encode identification information for the readers 64a, 64b, and 64c, respectively. As such, for example, imaging and decoding the barcode 76a with the smartphone 40 can facilitate connecting of the smartphone 40 with the reader 64a, imaging and decoding the barcode 76b with the smartphone 40 can facilitate connecting of the smartphone 40 with the reader 64b, and imaging and decoding the barcode 76c with the smartphone 40 can facilitate connecting of the smartphone 40 with the reader 64c. An operator can accordingly image one (or more) of the barcodes 76a, 76b, and 76c in order to selectively connect with one (or more) of the readers 64a, 64b, and 64c of the tunnel 62. In some embodiments, text (or other) labels on the identification feature 70 can assist the operator in deciding which of multiple symbols (e.g., which of the barcodes 76a through 76c) to image.

In some embodiments, connecting the smartphone 40 with multiple distinct components of the machine vision system 60 can be facilitated by other configurations of the identification feature 70. For example, the identification feature 70 can be configured with multiple electronic devices (e.g., multiple RFID tags or Bluetooth® beacons), each associated with a particular one (or more) of the readers 64. As another example, the identification feature 70 can be configured with a single electronic device (e.g., a single RFID tag or Bluetooth® beacon) or symbol configured to communicate separate identification information for each of the readers 64 (or sub-groups thereof) or other information facilitating communication with select ones of the readers 64 (e.g., general identification information for the machine vision system 60 that indicates the inclusion of each of the readers 64 in the machine vision system 60).

In some embodiments, the tunnel 62 may be disposed at a location that is difficult for an operator to access. For example, as illustrated in FIG. 3C, the tunnel 62 may be supported on an elevated support structure 78, with the tunnel 62 ten feet or more above the floor of the relevant facility. In such a case, for example, it may be useful to dispose the identification feature 70 remotely from the tunnel 62, such that the identification feature 70 is easily accessible by an operator (e.g., available for easy image acquisition). For example, where the tunnel 62 is supported on the elevated support structure 78, it may be useful to dispose the identification feature on (or near) the support structure 78, but at a height that is within arm's reach for a typical operator (e.g., at a height of 5 feet).

In some cases, the identification features for multiple machine vision systems (not shown) or components thereof may be within communication range of the smartphone 40. In such cases, operator input may be required to select one or more of the machine vision systems (or components) for connecting. For example, the smartphone 40 may be configured to display a list of machine vision systems (or components) that are within communication range of the smartphone 40, and an operator may be enabled to select one or more of the displayed machine vision systems (or components) for connecting.

Some embodiments of the disclosure can include a machine vision application for a mobile device and a machine vision system, which can generally provide (or assist in providing) the functionality described herein. In some implementations, as illustrated in FIG. 4, a machine vision application can be configured as a mobile application 90 that executes on (or is accessible by) a mobile device such as the smartphone 40.

In some implementations, the mobile application 90 (or another machine vision application) can be initiated (i.e., launched) based upon a request by an operator. For example, an operator of the smartphone 40 can initiate the mobile application 90 by selecting an icon (not shown) on a display of the smartphone 40.

In some implementations, the mobile application 90 can be initiated automatically. For example, the mobile application 90 can be initiated automatically based upon receipt by the smartphone 40 of relevant identification information from an identification feature of a relevant machine vision system.

The mobile application 90 (or another machine vision application) can include various modules to implement the functionality described herein, some examples of which are discussed below. It will be understood that the modules expressly discussed herein are presented as examples only. In some implementations, functionality of some of the modules that are expressly discussed herein can be executed by other modules. Likewise, in some implementations, some of the modules discussed herein can be combined with or subsumed by other modules, or can be subdivided into multiple distinct modules.

In some implementations, the mobile application 90 can include an identification module 92. Generally, the identification module 92 can be configured to receive identification information for a machine vision system. As such, in some implementations, the identification module 92 can be configured to receive (e.g., acquire) an image of a symbol included on an identification feature of a machine vision system, and to decode the symbol in order to extract the relevant identification information. For example, the identification module 92 can be in communication with the camera 48 of the smartphone 40 (see FIG. 2A) in order to receive an image of a barcode or other symbol. In some implementations, the identification module 92 can be configured to control operation of the camera 48, in order to control the acquisition of the relevant image, as well as to receive the image for decoding.

In some implementations, the identification module 92 can be configured to receive identification via an electronic transmission from an electronic device included in an identification feature of a machine vision system. For example, the identification module 92 can be in communication with an antenna (not shown) of the smartphone 40 in order to receive and interpret electronic communication from a Bluetooth® beacon, RFID tag, NFC tag, or other electronic identification device.

In some implementations, as also noted above, the mobile application 90 can be initiated automatically based upon receipt of relevant identification information for a machine vision system. In such a case, for example, the identification module 92 may be inactive before the smartphone 40 receives the identification information, or may execute reduced or different functionality than that described above. For example, where identification information is received via a separate symbol-decoding application of the smartphone 40 (e.g., a barcode-reading application), the identification module 92 may not necessarily be utilized to acquire identification information (e.g., by acquiring an image of the relevant barcode). Rather, for example, the identification module 92 may function simply to receive the identification information that was encoded in the image, interpret the identification information, and/or trigger the execution of additional functionality of the mobile application 90.

In some implementations, the mobile application 90 can also include a connecting module 94. Generally, the connecting module 94 can be configured to connect the smartphone 40 with the machine vision system, based upon receiving relevant identification information. As also discussed above, once the smartphone 40 is connected with the machine vision system (e.g., as facilitated by the connecting module 94), the smartphone 40 can be used to execute various machine vision operations, including management, image acquisition, and image processing operations.

In some implementations, the connecting module 94 can connect the smartphone 40 with the relevant machine vision system automatically. For example, where the identification information received and interpreted by the identification module 92 indicates a communication address and protocol for a particular machine vision system (or component thereof), the connecting module 94 can automatically establish communication between the smartphone 40 and a communication interface of the machine vision system and the smartphone 40 can proceed with execution of various machine vision operations (e.g., maintenance, control, or monitoring operations for the machine vision system).

In some implementations, the connecting module 94 can automatically present a user interface that allows an operator to command a connection of the smartphone 40 with a particular machine vision system or component thereof. This can be useful where the smartphone 40 is within range of multiple machine vision systems (or components thereof), such that an operator may need to select a particular machine vision system (or component(s)) for a desired connection. For example, when the smartphone 40 is disposed at a particular location in a facility, the identification module 92 may receive identification information for machine vision systems configured as first and second machine vision tunnels (e.g., tunnels similar to the tunnel 62 of FIG. 3A). Further, the identification module 92 may receive identification information for multiple components of the first and second machine vision tunnels (e.g., leading reader A and following readers B and C of the first tunnel, and readers D and E of the second tunnel). In order to allow an operator of the smartphone 40 to select one or more of these machine vision systems (or readers) for further operations, the connecting module 94 can present a particular user interface.

In the example illustrated in FIG. 5, one such user interface 96 can include selection icons 98a through 98g corresponding to the first and second tunnels noted above, and to the various readers included therein. By selecting one or more of the selection icons 98a through 98g, an operator of the smartphone 40 can command the mobile application 90 to connect the smartphone 40 with the corresponding tunnel(s) or reader(s). For example, by selecting selection icon 98a, the operator can command the mobile application 90 to connect the smartphone 40 with the leading reader A of the first tunnel, and by selecting selection icon 98d, the operator can command the mobile application 90 to connect the smartphone 40 with the entire first tunnel, including each of the readers A, B, and C included therein.

In other implementations, other user interfaces can be used. In some implementations, user interfaces can provide for tiered selection of particular machine vision systems or system components. For example, with respect to the first and second tunnels discussed above with regard to FIG. 5, an alternative user interface can first provide selection icons only for the tunnels themselves, then can provide additional selection icons for components of the tunnels (e.g., the particular readers) once a selection icon for a particular tunnel has been selected.

In some implementations, selection icons (or other user-interface components) can be ordered or arranged in particular ways. For example, where identification information for various machine vision systems (or components thereof) indicates the distance of those machine vision systems (or components thereof) from the smartphone 40, a user interface provided by the connecting module 94 can arrange selection icons for the machine vision systems (or components thereof) with an order that is determined based on relative distance of the machine vision systems (or components) from (or proximity of the machine vision systems or components to) the smartphone 40. As another example, a user interface provided by the connecting module 94 can selectively include (or exclude) particular selection icons for the machine vision systems (or components thereof) based on proximity information.

Referring again to FIG. 4, the connecting module 94 can also be configured to initiate (e.g., automatically initiate) a machine vision operation module 100 or a machine vision management module 102. In some implementations, the connecting module 94 can initiate one or both of the machine vision operation and management modules 100 and 102 based directly upon receipt of identification information. For example, where the identification module 92 automatically identifies a machine vision system (or component) for connecting with the smartphone 40 based on received identification information, the connecting module 94 can automatically connect the smartphone 40 with the identified machine vision system (or component) and can automatically initiate one or both of the machine vision operation and management modules 100 and 102 without input from an operator. In contrast, in some implementations, the connecting module 94 can initiate one or both of the machine vision operation and management modules 100 and 102 based upon receipt of identification information and upon receipt of associated input from an operator. For example, the connecting module 94 can initiate one or both of the machine vision operation and management modules 100 and 102 based upon selection by the operator, using the user interface 96, of a particular machine vision system or component associated with the received identification information.

The machine vision operation module 100 can be configured to provide various types of functionality for inter-operation of the smartphone 40 and a connected machine vision system in execution of machine vision functionality. In some implementations, for example, the machine vision operation module 100 can be configured to trigger (or otherwise control) the acquisition of an image of a symbol for decoding, or to trigger (or otherwise control) decoding or other analysis of an acquired image of a symbol. In some implementations, the machine vision operation module 100 can be configured to at least partly direct a user of the smartphone 40 in various machine vision operations. For example, the machine vision operation module 100 can guide a user through image acquisition, image analysis, or other utilization of a connected machine vision system (or component), with various levels of assistance.

The machine vision management module 102 can be configured to provide various types of functionality for management of a connected machine vision system with the smartphone 40. In some implementations, the machine vision management module 102 can be configured to allow a user of the smartphone 40 to manage (e.g., check or adjust) operational settings of the connected machine vision system (or component). In some implementations, the machine vision management module 102 can be configured to allow a user of the smartphone 40 to conduct performance analysis or other diagnostic or maintenance operations for the connected machine vision system (or component).

In some implementations, the types of connections or functionality offered on a mobile device (e.g., the smartphone 40) can depend on the distance of the identified machine vision system(s) (or component thereof) from the mobile device. In some implementations, for example, the connecting module 94 can be configured to connect the mobile device to a machine vision system with relatively close proximity via one or more preferred communication means (e.g., Bluetooth® or NFC), and to connect the mobile device to a machine vision system that is more remotely located via one or more other preferred communication means (e.g., via a local wireless network). Similarly, in some implementations, the machine vision operation module 100 or the machine vision management module 102 can be configured to enable functionality for a machine vision system with relatively close proximity to the mobile device that is different (in whole or in part) from functionality that is enabled for a more remotely located machine vision system. For example, in some implementations, advanced management functionality can be enabled for connections with close-proximity machine vision systems, and relatively simple (or more passive) monitoring functionality can be enabled for connections with more remotely located machine vision systems.

In some embodiments, a machine vision system can include an imaging device configured as an accessory (e.g., a removable attachment) for a mobile device. In some embodiments, such an accessory can include an identification feature that assists in connecting the mobile device with the accessory or attachment. For example, an accessory for a mobile device can include Bluetooth® beacon or other electronic device that transmits identification information to facilitate connecting of the mobile device with the accessory.

In some embodiments, receipt at the mobile device of identification information from a identification feature of an accessory can automatically trigger connecting of the accessory and the mobile device. For example, when the identification module 92 (see FIG. 4) receives identification information associated with an accessory, the smartphone 40 can be automatically connected with the accessory, or a user interface can be presented for a user to selectively command connecting of the mobile device and the accessory (e.g., in both cases, as controlled by the connecting module 94).

In some implementations, a mobile device can be automatically connected with an accessory (or a user interface for connecting automatically presented) based upon proximity of the mobile device to the accessory or physical attachment of the mobile device to the accessory (e.g., as indicated by proximity information from a Bluetooth® beacon included in the accessory). For example, the mobile device can be automatically connected with the accessory only when proximity information indicates that the accessory is (or at least in likely) attached to the mobile device.

In some implementations, a mobile device can automatically initiate (or otherwise operate) a machine vision operation module (e.g., the machine vision operation module 100) or a machine vision management module (e.g., the machine vision management module 102) based upon receipt of identification information from an accessory. For example, identification information received at the smartphone 40 from a particular accessory may cause the machine vision operation or management modules 100 or 102 to execute (or make available) particular functionality that is related to the capabilities of the accessory.

In some implementations, an accessory can include a communication interface that is distinct from an identification feature. For example, an accessory can include an electronic device configured to provide identification information (e.g., a Bluetooth® beacon or NFC tag) and can include a separate communication interface for other communication with a mobile device (e.g., a USB interface for communication of operational information between the accessory and the mobile device). In some implementations, an accessory may include only an identification feature. For example, an accessory may be a passive accessory that does not actively provide information to a mobile device other than providing identification information to facilitate connecting (and interoperation) of the accessory and the mobile device.

Figure 6:
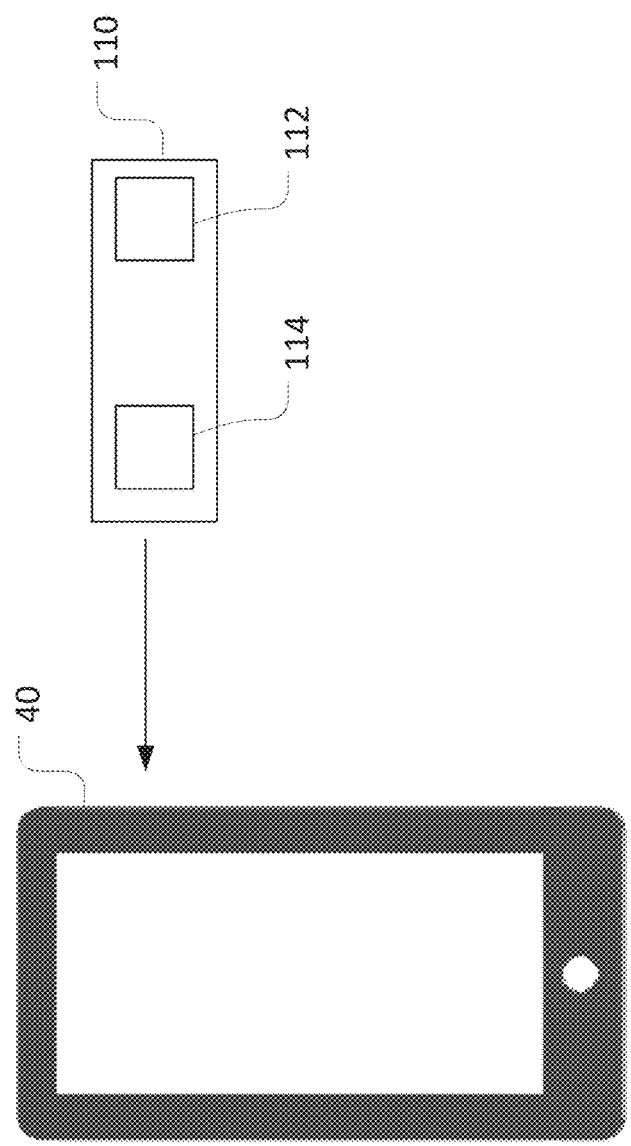
FIG. 6 is a schematic view of a connecting of the mobile device of FIG. 1 with a machine vision system configured as an attachment for the mobile device.
Figure 7:
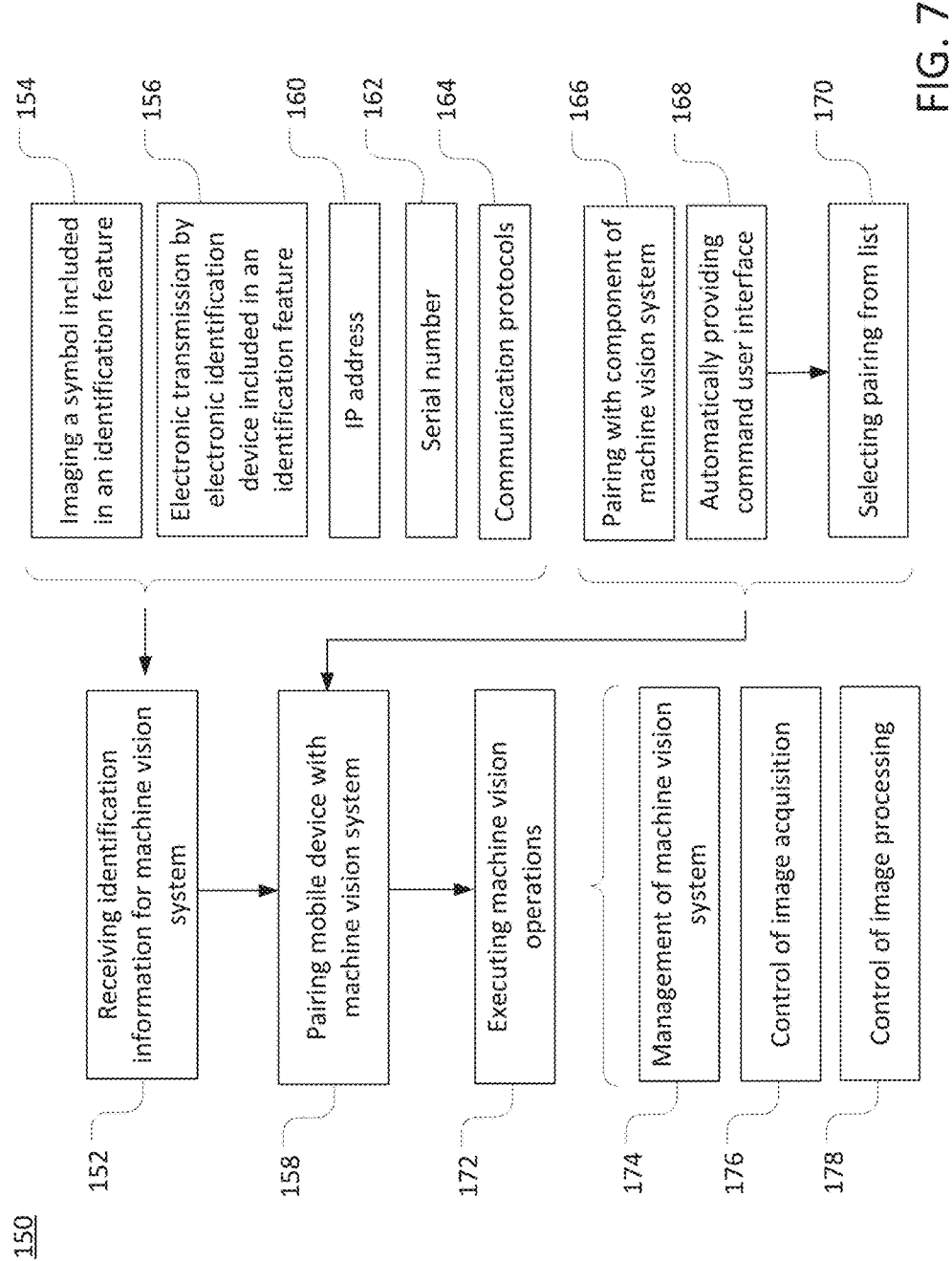
FIG. 7 is a diagrammatic view of a connecting method for a mobile device and a machine vision system, in accordance with further embodiments of the disclosure.

In some embodiments, an accessory can be configured as an attachment for the smartphone 40. As illustrated in FIG. 6, for example, an accessory can be an imaging device configured as a passive lighting device 110. The passive lighting device 110 can be configured to mechanically attach to the smartphone 40, with an optical system 112 of the passive lighting device 110 being thereby aligned with a flash or other light source (not shown) of the smartphone 40. This may be useful, for example, in order for the passive lighting device 110 to provide an aiming pattern (or other functionality) to assist a user of the smartphone 40 in using the camera 48 (see FIG. 2A) of the smartphone 40 to acquire images for machine-vision analysis.

In addition to the optical system 112, the passive lighting device 110 can also include an identification feature 114, such as a symbol, Bluetooth® beacon, or NFC or RFID tag, which is configured to communicate identification information for the passive lighting device 110 to the smartphone 40. Based upon receipt of identification information for the passive lighting device 110 from the identification feature 114 (e.g., via imaging of electronic transmissions of data), the smartphone 40 (e.g., via the mobile application 90 illustrated in FIG. 4) can implement various functionality. For example, based upon receipt of identification information from the identification feature 114, the mobile application 90 can automatically initiate an image acquisition and analysis application for use with the passive lighting device 110, or can automatically initiate particular functionality within a general machine vision application (e.g., image acquisition and analysis functionality) that relates specifically to the passive lighting device 110.

In some implementations, based upon receipt of identification information from the identification feature 114, the mobile application 90 can automatically implement particular settings for machine vision operations or management, which may be specifically related to (e.g., customized for) the passive lighting device 110. For example, based upon receipt of identification information from the identification feature 114, the mobile application 90 can automatically implement particular settings for the flash or other light source of the smartphone 40 that are optimized for image acquisition using the passive lighting device 110.

In some implementations, based upon receipt of identification information from the identification feature 114, the mobile application 90 can provide directions to a user of the smartphone 40 in order to assist in acquisition or analysis of images. For example, based upon receiving identification information from the identification feature 114, the mobile application 90 can provide instructions to a user regarding the use of the passive lighting device 110 to assist in image acquisition.

In some implementations, the smartphone 40 (via the mobile application 90) may be configured to receive, or act in response to receipt of, identification information from the identification feature 114 only if the passive lighting device 110 is within a particular proximity to or actually attached to the smartphone 40. This may be useful, for example, to avoid automatic initiation (or other execution) of particular modules of the smartphone 40 that are specifically associated with the passive lighting device 110 until it is relatively certain that a user of the smartphone 40 intends to use the passive lighting device 110 with the smartphone 40 or that the passive lighting device 110 is appropriately aligned for use.

It will be understood that the form and functionality of the passive lighting device 110 is presented as an example only. Other accessories in accordance with this disclosure can exhibit other forms or other functions. For example, an alternative passive lighting device (or other attachment) can be configured as a full case or shroud for the mobile device, and can include features or systems other than the identification feature 114 and the optical system 112.

In some implementations, various functionality of the disclosed technology, including functionality discussed above, can be implemented via a method, such as a connecting method 150. In some implementations, the connecting method 150 can include a mobile device receiving 152 identification information for a machine vision system. In some implementations, the identification information can be received 152 at the mobile device from (i.e., can be communicated to the mobile device via) an identification feature associated with the machine vision system. In some implementations, the identification information can be encoded in a symbol included in the identification feature, and can be received 152 at the mobile device based upon an imaging 154 of the symbol by an image acquisition device (e.g., a camera associated with the mobile device). In some implementations, the identification information can be stored by (or otherwise accessible to) an electronic identification device included in the identification feature, and can be received 152 at the mobile device via electronic transmission 156 of the identification information by the electronic identification device.

Based upon the mobile device receiving 152 the identification information, the mobile device can be connected 158 with the machine vision system. For example, the identification information can indicate an address for the machine vision system (e.g., an IP address 160), or another identifier (e.g., a serial number 162) that enables the mobile device to connect to the machine vision system for exchanges of data (including, for example, image data and various commands). As another example, the identification information can indicate communication protocols 164 for the machine vision system (e.g., requirements for syntax, headers, other formatting, data size or content, and so on).

In some implementations, the connecting 158 of the mobile device with the machine vision system can include connecting 166 of the mobile device with a component (or components) of the machine vision system. In some implementations, the connecting 158 of the mobile device can be based on automatically providing 168 a user interface at the mobile device for commanding the connecting (e.g., for selecting 170 a particular connection from a list of options).

In some implementations, the connecting 158 of the mobile device with the machine vision system can facilitate the use of the mobile device for executing 172 one or more machine vision operations relating to the machine vision system. For example, the connecting 158 of the mobile device with the machine vision system can facilitate management 174 of the machine vision system (e.g., to adjust settings, perform maintenance, assess system performance, and so on for an image acquisition or other imaging device of the machine vision system), control 176 of an acquisition of an image using the machine vision system (e.g., using an image acquisition device of the machine vision system), and control 178 of a processing of an image acquired using the machine vision system (e.g., processing of the image to decode imaged symbols).

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A connecting system for machine vision operations using a mobile device, the connecting system comprising:
    a machine vision system including an imaging device; and
    an identification feature associated with the machine vision system and including at least one of: a symbol for communicating identification information for the machine vision system to the mobile device via an imaging of the symbol by a camera associated with the mobile device, and an electronic identification device for communicating the identification information to the mobile device via electronic transmission to the mobile device;
    the identification information being configured to facilitate connecting of the mobile device with the machine vision system for interoperation of the mobile device and the machine vision system, when the identification information is received at the mobile device; and
    the identification information being configured to facilitate connecting of the mobile device with the machine vision system by automatically enabling, at the mobile device, machine vision functionality that is selected based upon a proximity of the mobile device to the machine vision system.

2. The connecting system of claim 1, wherein a first machine vision functionality is enabled for a first proximity distance between the mobile device and the imaging device and a second machine vision functionality, different from the first machine vision functionality, is enabled for a second proximity distance between the mobile device and the imaging device that is larger than the first proximity distance.

3. The connecting system of claim 1, wherein the symbol is configured as a visual symbol, such that the identification information for the machine vision system is communicated to the mobile device via imaging of the visual symbol by the camera associated with the mobile device.

4. The connecting system of claim 3, wherein the visual symbol is disposed remotely from the imaging device.

5. The connecting system of claim 1, wherein the electronic identification device for transmitting the identification information to the mobile device is configured as one or more of an NFC tag, a Bluetooth® beacon, and an RFID tag.

6. The connecting system of claim 1, wherein the identification information indicates an electronic address for the machine vision system, to facilitate the connecting of the mobile device with the machine vision system via an electronic communication interface of the machine vision system.

7. The connecting system of claim 1, wherein the identification feature is configured to facilitate connecting of the mobile device with the machine vision system via a first communication channel for a first proximity distance between the mobile device and the imaging device and connecting of the mobile device with the machine vision system via a second communication channel, different from the first communication channel, for a second proximity distance between the mobile device and the imaging device that is larger than the first proximity distance.

8. The connecting system 1, wherein the imaging device is a slave imaging device controlled via a separate master imaging device.

9. The connecting system of claim 1, wherein the imaging device of the machine vision system is a lighting device for image acquisition that is configured for removable attachment to the mobile device.

10. A computer program product, tangibly embodied in a non-transitory computer readable medium and configured for use with a mobile device and a machine vision system, the machine vision system including an imaging device and an identification feature, the computer program product including instructions operable to cause a data processing apparatus to:
    receive identification information for the machine vision system based upon one or more of: an imaging, by a camera associated with the mobile device, of a symbol forming at least part of the identification feature, and an electronic transmission to the mobile device via an electronic identification device forming at least part of the identification feature;
    connect the mobile device with the machine vision system, based upon receiving the identification information, for execution of a machine vision operation; and
    enable, at the mobile device, machine vision functionality in a machine vision module, the machine vision functionality being selected based upon a proximity of the mobile device to the machine vision system.

11. The computer program product of claim 10, wherein a first machine vision functionality is automatically enabled for a first proximity distance between the mobile device and the imaging device and a second machine vision functionality, different from the first machine vision functionality, is automatically enabled for a second proximity distance between the mobile device and the imaging device that is larger than the first proximity distance.

12. The computer program product of claim 10, wherein the symbol is configured as a visual symbol, such that the identification information for the machine vision system is communicated to the mobile device via imaging of the visual symbol by the camera associated with the mobile device.

13. The computer program product of claim 10, wherein the instructions are operable to cause the data processing apparatus to:
    connect the mobile device with the machine vision system via a first communication channel for a first proximity distance between the mobile device and the imaging device; and
    connect the mobile device with the machine vision system via a second communication channel, different from the first communication channel, for a second proximity distance between the mobile device and the imaging device that is larger than the first proximity distance.

14. The computer program product of claim 10, wherein a user interface for commanding connecting of the mobile device with the machine vision system includes a list of imaging devices populated at least in part based upon the received identification information; and wherein the user interface permits a user of the mobile device to select at least one of the imaging devices for connecting with the mobile device.

15. The computer program product of claim 14, wherein the list is ordered based upon the proximity of the imaging devices to the mobile device.

16. The computer program product of claim 10, wherein the imaging device of the machine vision system is a lighting accessory for image acquisition that is configured for mechanical attachment to the mobile device.

17. The computer program product of claim 16, wherein the instructions are operable to at least partly direct a user of the mobile device in image acquisition using the lighting device.

18. A method of connecting a machine vision system with a mobile device, the machine vision system including an imaging device and an identification feature, the method comprising:

receiving identification information for the machine vision system based upon one or more of: an imaging, by a camera associated with the mobile device, of a symbol forming at least part of the identification feature, and an electronic transmission to the mobile device via an electronic identification device forming at least part of the identification feature; and based upon receiving the identification information, connecting the mobile device with the machine vision system for execution of a machine vision operation;

the imaging device being a lighting device for image acquisition that is configured to be removably mechanically attached to the mobile device as an accessory to the mobile device; and the mobile device being connected to the machine vision system based upon the proximity of the imaging device to the mobile device indicating that the imaging device is attached to the mobile device.

19. The method of claim 18, wherein the electronic identification device for transmitting the identification information to the mobile device is configured as one or more of an NFC tag, a Bluetooth® beacon, and an RFID tag.

* * * * *